LIGHT SERVO SYSTEM FOR NON-INTERMITTENT PROJECTOR
Filed March 17, 1951
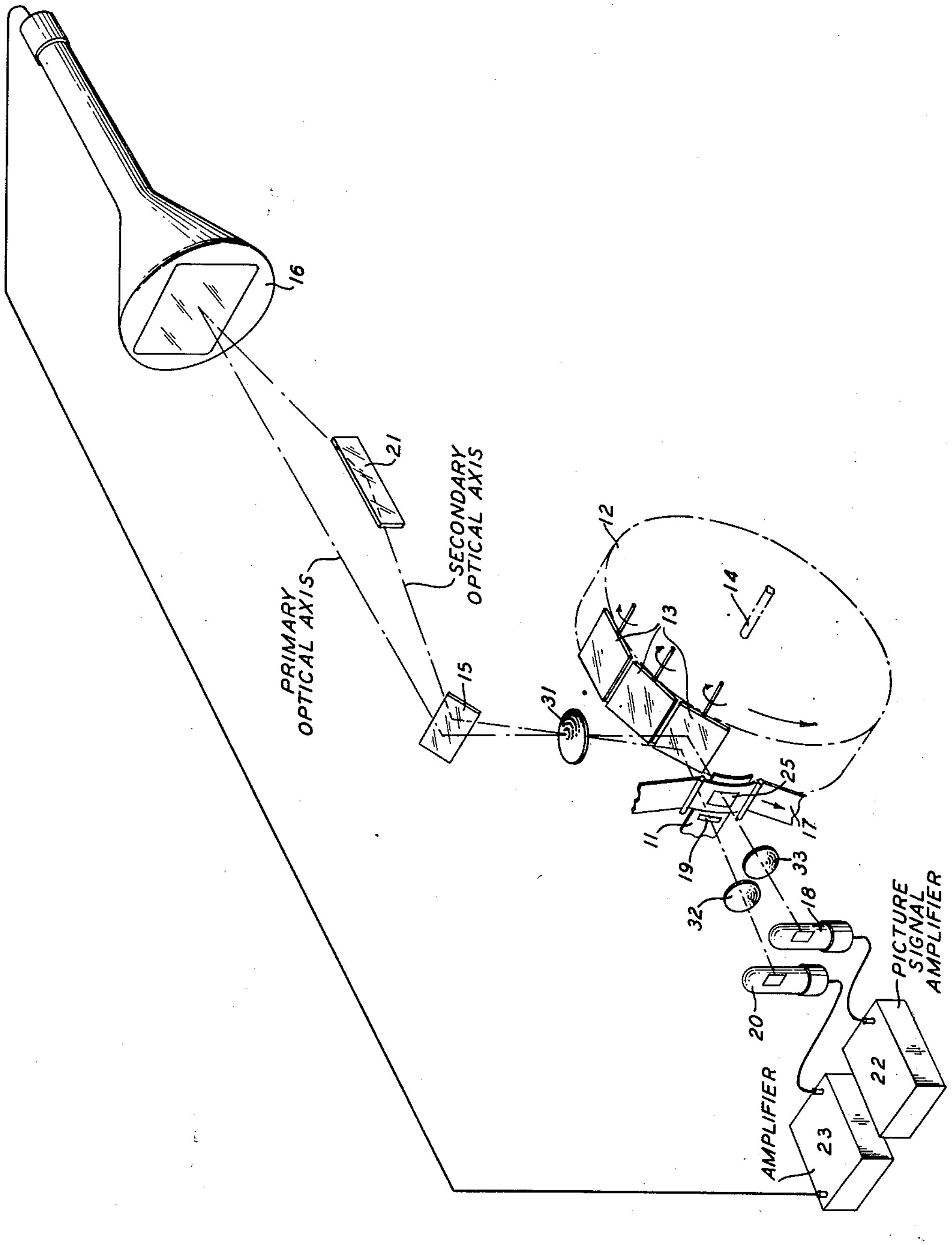
INVENTORS: R. E. GRAHAM
C. F. MATTKE
BY Hugh S. Wertz
ATTORNEY United States Patent Office 2,779,819

Patented Jan. 29, 1957

2,779,819

LIGHT SERVO SYSTEM FOR NON-INTERMITTENT PROJECTOR

Robert E. Graham, Chatham, and Charles F. Mattke, Fanwood, N. J., assignors to Bell Telephone Laboratories, Incorporated, New York, N. Y., a corporation of New York Application March 17, 1951, Serial No. 216,234

6 Claims. (Cl. 178—7.2)

This invention relates to a continuous projector for motion pictures and more particularly to a light intensity regulating system for such a projector when used as a film scanner, such as for television purposes.

In a pending application of C. F. Mattke, Serial No. 124,403, filed October 29, 1949, and which issued as United States Patent 2,718,549 on September 20, 1955, there is disclosed a special film projector by means of which the frames of a continuously moving motion picture film are projected as stationary images on a viewing screen, and the illusion of scene motion is produced as images of successive frames are merged on the viewing screen. This projector compensates for the movement of the film by employing a rotating crown of mirrors in the optical path. When viewed through the crown of mirrors, the film movement appears to be stopped so that successive frames blend into and out of view without flicker.

This projector, in an important example of practice, may also be used as a scanner of continuously moving motion picture film for television purposes. Ordinarily, the television scanning of motion picture presents considerable difficulty in that the movie standard is 24 frames per second as compared with the television standard of 30 frames or 60 fields per second. This special projector, however, by virtue of its non-intermittent operation, avoids the consequences of this dissimilarity and can use standard 24 frame motion picture film. In an illustrative embodiment of this example of practice, the viewing screen is replaced by the luminescent screen of a cathode ray tube, the cathode beam of which is caused to scan the luminescent screen in the desired scanning pattern. In operating this projector, a moving light beam is formed which is projected through the frames of a continuously moving motion picture film, thereby scanning the frames of the film. The transmitted beam is modulated in accordance with the picture information of the moving film and then is directed to a photosensitive device wherein corresponding television image currents are produced.

However, this projector, comprising as it does moving reflecting surfaces, is normally characterized by cyclical variations in the photometric transmission efficiency of the optical path between the luminescent screen and the moving film. Effectively this results in a variation of the light available at the moving film. For high fidelity of reproduction, however, it is important that the intensity of the light available at the moving film remain substantially constant if spurious modulation of the video signal is to be avoided.

Accordingly, it is an object of this invention to maintain constant in such a scanner the intensity of the light available to the film, or more precisely to maintain the electrical output of the picture signal pickup independent of the scanning position when a clear film is being viewed.

This is done, in accordance with the present invention, by incorporating as a part of the projector a light-regulating servo system. An auxiliary optical path is provided between the film and light source whose photometric efficiency is made to undergo substantially the same fluctuations which characterize the primary optical path. The transmission of this auxiliary path is then made to control a servo system which adjusts the intensity of the cathode beam light source to compensate for the variations in efficiency of the optical path or any other undesirable fluctuations, such as variations resulting from non-uniformities in luminescence of the screen of the cathode ray tube, and to maintain thereby the light intensity at the film substantially constant.

The invention will be more fully understood from the following more detailed description taken in connection with the appended drawing which is a perspective view of an illustrative system in accordance with the present invention.

In the drawing, there is shown schematically and by way of example one form of continuous film scanner to which the invention is applicable. In this film scanner, the basic components are: a curved film gate 11; a rotating mirror drum 12 which contains a crown of mirrors 13 whose axes are mounted parallel with the drum axle 14; an error correcting mirror 15, whose function is described in the pending application Serial No. 167,872, filed June 13, 1950, of R. E. Graham and C. F. Mattke, which issued as United States Patent 2,666,356 on January 19, 1954; and the spot scanning cathode ray tube 16. In operation, the moving picture film 17 is moved down at a constant rate (at the rate at which it was taken—24 frames per second, for example) past the opening 25 in the gate 11, where it is scanned by the moving light beam from the cathode ray tube 16. For the scanning process, the light beam is supplied from the cathode ray source 16 by way of reflections from the error correcting mirror 15 and the rotating crown 13 for traversal of the moving film at the opening 25 of film gate 11. The picture modulated light beam is thereafter collected by the photosensitive means 18 for transformation into television image currents which are amplified by the picture signal amplifier 22. Additionally for the practice of the present invention, there are provided: a light slit 19 in the film gate 11 which remains unobstructed by the moving film 17; a second photosensitive device 20 positioned beyond the slit 19 for collecting light passing therethrough; and a fixed mirror 21 positioned to provide an optical path between the cathode ray light source 16 and the photosensitive means 20. This secondary optical path also includes means for producing reflections from the mirrors 21 and 15 and the crown 13 before traversal of the slit 19 and collection by the photosensitive device 20, and is intended to have a photometric efficiency which varies substantially in the same manner as does the efficiency of the path between the scanning spot of the cathode ray tube and the film opening in the gate 11. The light currents developed by the photosensitive device 20 are supplied to the amplifier 23, whose output is applied to vary the voltage on the intensity control element of the cathode ray tube 16. The amplifier 23 is designed to amplify any variations from the intensity desired at the photosensitive means 20 and to develop an output for adjusting the intensity of the cathode ray source 16. In this way, variations in the efficiency of the primary optical path can be compensated by counteracting changes in the intensity of the light source. By providing a secondary optical path, whose efficiency varies substantially in the same manner as the primary path, there is obtained a continuous measure of the efficiency of the primary path. To insure the maximum similarity in the efficiency of the two paths, it is advantageous that the two paths of travel be as nearly identical as possible. It is especially desirable that the angle of incidence on the moving reflecting elements, the most significant factor in producing the change in efficiency, be as identical as possible for the two beams throughout the scanning cycle. Thus, any variation in intensity of the light striking the auxiliary photosensitive device 20 will be a fairly accurate measure of the variation in intensity of the light being made available to the moving film at the opening of the film gate 11. By causing variations from a fixed predetermined intensity level at the photosensitive device 20 to produce electrical signals whose polarity is determined by the sign of the variations and by applying these electrical signals to the intensity control elements of the spot scanning cathode ray tube, the intensity thereof can be adjusted to oppose the variations in efficiency of the optical paths and maintain substantially constant the intensity of the light at the film gate. If the gain around this negative feedback loop is made suitably high, the light intensity will be held closely constant, both at the film opening 25 and at the slit 19 of the film gate 11.

It will, of course, be appreciated that the above-described arrangement has been simplified for purposes of exposition. For efficient light transmission over either optical path, condensing lenses are necessary for properly focussing the light beams utilized. By way of example, simple lens arrangements have been shown for the two paths. These include the objective lens 31 which serves both paths and the two condensing lenses 32 and 33 for focussing the light in the primary and secondary paths to their respective photosensitive light collectors.

The above functional description assumes that the electrical outputs of the two photosensitive cells 18 and 20 will be constant when the flying spot intensity is constant at the film opening in the film gate and at the gate slit 19. As a practical matter non-uniform sensitivity over the areas of the photo-cathodes, as well as the non-uniform properties of the condenser lens, will limit the precise accuracy of this assumption. What is desired in this case is that the electrical output of the picture signal photoelectric cell 18 be constant independent of the scanning when a clear film is in the gate. The light regulating system of the present invention will insure this desired condition if the non-uniformities due to photo-cathode variations and condenser lenses are the same for the two optical paths.

It can be seen that numerous other secondary optical paths can be chosen to provide transmission characteristics which resemble that of the primary or principal path. The arrangement described is intended as merely illustrative of the principles of the invention.

Moreover, it is to be further understood that the invention is not intended to be limited to incorporation in the particular projector described. Numerous changes are possible in the precise form of the projector used without departing from the spirit and scope of the present invention.

What is claimed is:

1. In combination, a film gate for supporting moving motion picture film, a cathode ray source for providing a scanning beam of light, means for applying said scanning beam to said film gate, said means including moving reflecting elements which produce variations in the transmission efficiency of said beam, and means responsive to the intensity of the beam at the film gate for varying the intensity of the cathode ray source in a direction to maintain constant the intensity of said beam at the film gate.

2. In combination, a film gate for supporting moving motion picture film, a cathode ray source for forming a scanning beam of light, means forming a first optical path, between said source and the film gate, which includes moving reflecting surfaces which produce variations in the transmission efficiency of said path, a photosensitive device, means forming a second optical path, between said cathode ray source and the photosensitive device, whose transmission efficiency varies in the manner of the efficiency of said first path, and means controlled by the intensity of the scanning beam at the photosensitive device for adjusting the intensity of the cathode ray source.

3. In combination, a film gate for supporting moving motion picture film, which includes a light slit, a cathode ray source for forming a scanning beam of light, means forming a first optical path, between said source and the film gate, which includes moving reflecting surfaces which introduce variations in the transmission efficiency of said path, a photosensitive device, means forming a second optical path, between the cathode ray source and said photosensitive device and through said light slit which also includes said moving reflecting surfaces and whose transmission efficiency varies substantially in the manner of the efficiency of said first path, and means controlled by the intensity of the scanning beam at the photosensitive device for maintaining the intensity at the photosensitive device constant.

4. In a film scanner, a film gate having a film opening before which is moved motion picture film and a light slit which remains unobstructed by the moving film, a cathode ray source for providing a scanning beam, optical paths between said source and the film opening and between said source and the light slit including moving reflecting elements, a photosensitive device positioned behind said light slit, and means controlled by the intensity of the scanning beam at this photosensitive device for varying the intensity of the cathode ray source.

5. In a film scanner, a film gate having a film opening before which is moved motion picture film and a light slit which remains unobstructed by said moving film, a cathode ray source for forming a scanning beam for projection to said film opening and light slit, means forming a first optical path, between said source and the film opening, which includes moving reflecting surfaces which produce variations in the transmission efficiency of said path, a second optical path between said source and the light slit whose transmission efficiency varies substantially in the manner of the efficiency of said first path, and means at the light slit responsive to the intensity of the scanning spot and controlling therewith the intensity of the cathode ray source.

6. In a film scanner, a film gate having a film opening before which is moved motion picture film and a light slit which remains unobstructed by said moving film, a cathode ray source for forming a scanning beam for projection to said film opening and light slit, means forming a first optional path between said source and the film opening which includes moving reflecting surfaces which produce variations in the transmission efficiency of said path, means forming a second optical path between said source and the light slit whose transmission efficiency varies substantially in the manner of the efficiency of said first path, a photosensitive device responsive to the intensity of the scanning beam at the light slit, and means controlled by said intensity for adjusting the intensity of the cathode ray source and maintaining substantially constant thereby the intensity of the scanning beam at the film opening and the light slit.

References Cited in the file of this patent

UNITED STATES PATENTS

| | | |
|---|---|---|
| 2,199,608 | Barthelemy | May 7, 1940 |
| 2,274,530 | Collins | Feb. 24, 1942 |
| 2,523,296 | Harris | Sept. 26, 1950 |
| 2,622,147 | Condliffe et al. | Dec. 16, 1952 |